United States Patent [19]

Dobson

[11] 4,300,539
[45] Nov. 17, 1981

[54] SOLAR COLLECTOR

[75] Inventor: Michael J. Dobson, Tewkesbury, England

[73] Assignee: Ecosol Materials, Inc., New York, N.Y.

[21] Appl. No.: 95,156

[22] Filed: Nov. 19, 1979

Related U.S. Application Data

[60] Division of Ser. No. 945,077, Sep. 22, 1978, Pat. No. 4,213,929, and a continuation-in-part of Ser. No. 692,507, Jun. 3, 1976, Pat. No. 4,257,481.

[51] Int. Cl.³ .............................. F24J 3/02; F28F 9/02
[52] U.S. Cl. .................................... 126/448; 126/450; 165/175; 165/DIG. 8
[58] Field of Search ............... 126/447, 449, 448, 901, 126/450; 165/1, DIG. 8, 169, 170, 49, 175, 171; 52/577, 380; 425/62, 63, 87, 262; 249/176, 183, 114 R; 264/228

[56] References Cited

U.S. PATENT DOCUMENTS

| | | | |
|---|---|---|---|
| 1,571,929 | 2/1926 | Bronander | 425/446 |
| 2,126,301 | 8/1938 | Wolcott | 52/577 |
| 2,624,554 | 1/1953 | Morrison | 165/133 |
| 2,992,545 | 7/1961 | Walker | 165/169 |
| 3,314,475 | 4/1967 | Valyi | 165/170 |
| 3,372,738 | 3/1968 | Jan et al. | 165/175 |
| 3,626,149 | 12/1971 | Carney et al. | 219/213 |
| 3,632,724 | 1/1972 | Hilgeman | 264/317 |
| 3,782,132 | 1/1974 | Lohoff | 165/171 |
| 3,808,085 | 4/1974 | Givens | 52/659 |
| 3,848,665 | 11/1974 | Uerlichs et al. | 165/168 |
| 3,965,233 | 6/1976 | Ritter | 264/317 |
| 4,055,927 | 11/1977 | Tamaro | 52/577 |

FOREIGN PATENT DOCUMENTS

| | | | |
|---|---|---|---|
| 1868376 | 10/1976 | Australia | 264/317 |
| 1112253 | 8/1961 | Fed. Rep. of Germany | 264/317 |
| 1942215 | 4/1970 | Fed. Rep. of Germany | 264/317 |

Primary Examiner—Daniel J. O'Connor
Attorney, Agent, or Firm—Davis, Hoxie, Faithfull & Hapgood

[57] ABSTRACT

A solar collector panel is made from glass fiber reinforced concrete using a dissolvable core of polymer foam to form the internal passageways. The core is dissolved in a solution of solvent and polymer which impregnates and coats the concrete surfaces of the passageways to seal the passageways and to isolate the concrete from the heat transfer fluid.

2 Claims, 8 Drawing Figures

SOLAR COLLECTOR

This is a division of application Ser. No. 945,077, filed Sept. 22, 1978, now U.S. Pat. No. 4,213,929 and a continuation-in-part of Ser. No. 692,507, filed June 3, 1976, now U.S. Pat. No. 4,257,481.

BACKGROUND

The conversion of solar radiation into usable heat at adequate temperatures is the subject of much interest, but, heretofore, has been of relatively limited practical application. The basic technology is not new; however, realization of that technology in the form of commercial hardware has been retarded by the cost of the hardware, and by the cost of solar collector panels in particular. Most collector panels available today use expensive materials, require sophisticated manufacturing techniques available only in highly industrialized countries, and result in an apparatus which often is aesthetically unacceptable. An efficient, attractive, very inexpensive collector which is easily made near or at the sites of use, with low capital investment, and from cheap, common materials by labor of minimum skill is essential to the growth of practical solar heating. The present invention provides such a solar collector.

SUMMARY

Typical applications of the solar collector of the present invention are use as the heat source for heating room air or domestic hot water, as the energy source for room air cooling, for heating swimming pools, as a heat source for operating a vapor cycle engine to pump water or generate electricity, and many other applications in which heated water or heat generated vapor pressure are desirable. The collector panels of the present invention are useable as roofing by themselves, or can be placed on existing roofs. The panels can be formed in colors, patterns, or textures to closely resemble roof tiles or shingles. The panels can be used as paving for driveways, sidewalks, patios, swimming pool surrounds and the like. The panels can be used to form exterior walls.

According to the present invention, a solar collector panel is made entirely from concrete reinforced with alkali resistant glass fiber to result in an extraordinarily thin walled, light weight panel structure of great strength. Since the collector panel can be made in inexpensive molds by hand or with fairly basic machinery, it can be made with labor of relatively low skill in non-industrialized areas. Little or no energy is required for the manufacture. The panels can be made at or near the site of use.

A desire for relatively high collection efficiency has been a focus of much of the prior design effort for collector panels. This desire has been responsible in part for the complexity and cost of those panels. The desire for high efficiency is perhaps misguided, for the heat source is free and the only penalty of lower efficiency is the need for more collector area; a penalty easily accomodated if the collector cost is low. Comparative testing of collector panels of the present invention with several different more complex, allegedly highly efficient prior art collector panels revealed that the panels of the present invention were far more efficient than the compared panels, thereby reducing, rather than increasing, the collector area requirements.

DETAILED DESCRIPTION

Figure 1:
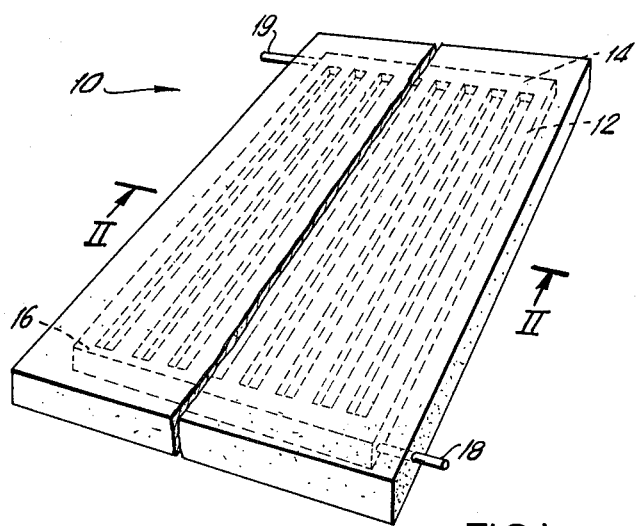

The following description is of a preferred embodiment of a solar collector according to the present invention. The described embodiment is a flat collector suitable for use as a roofing panel. The materials required are cement, sand, alkali resistant glass fiber, water, foamed polymer sheet, and a solvent for the polymer. The equipment required is that required to mix concrete, a suitable open mold, and hoses and a storage tank for the polymer solvent. The invention is preferably carried out with apparatus for spray application of glass fiber reinforced concrete (GRC), which apparatus is well known and widely used.

Figure 2:
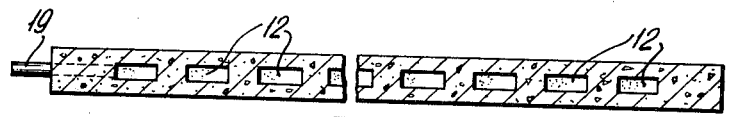
Figure 3:
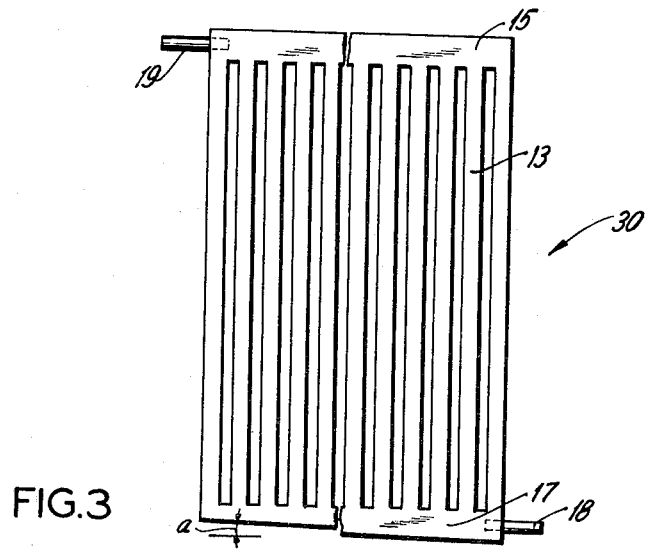
Figure 4:
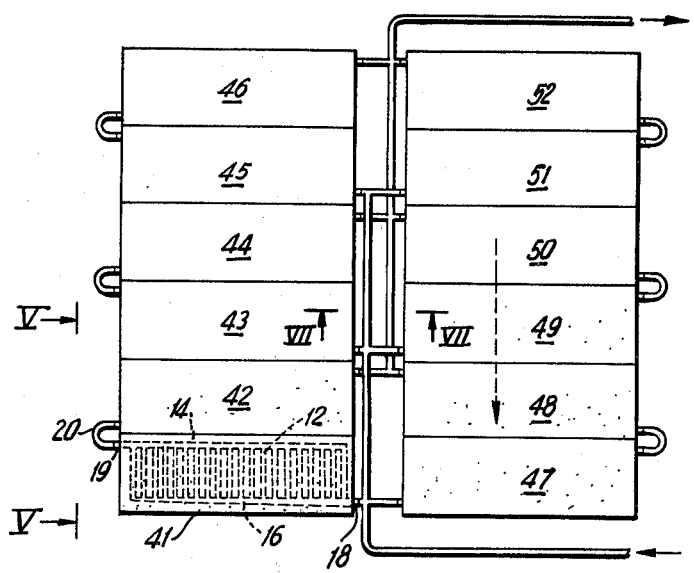
Figure 5:
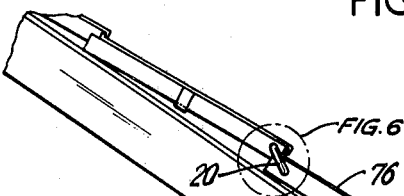
Figure 6:
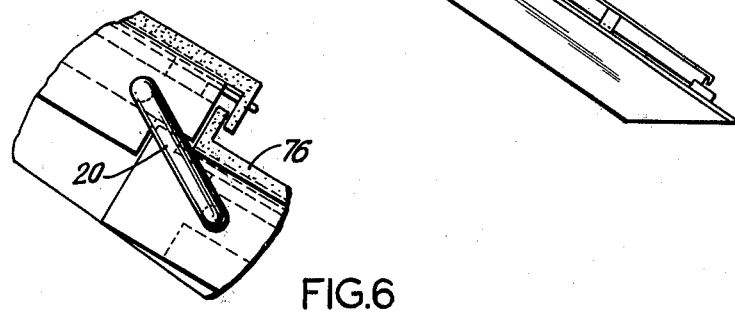
Figure 7:
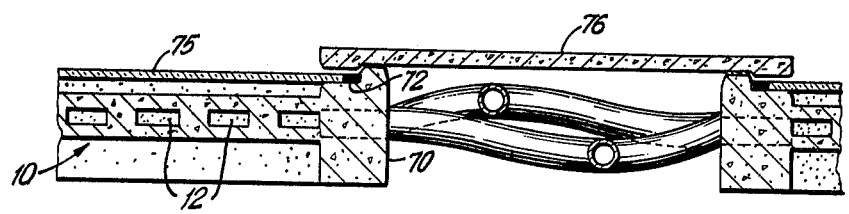
Figure 8:
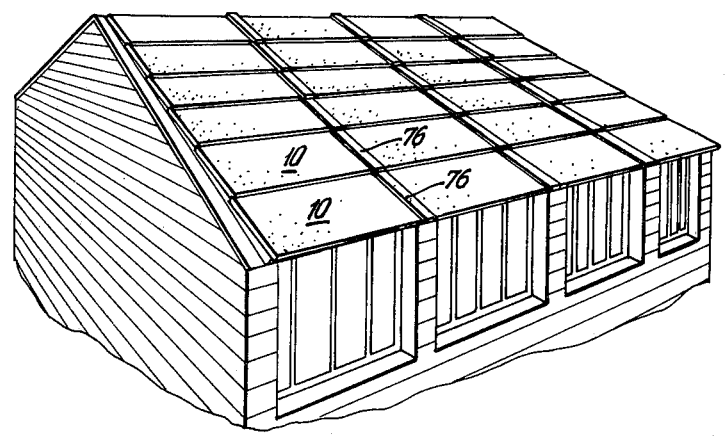

In the drawings;

FIG. 1 is a perspective view of a collector panel according to the present invention, FIG. 2 is a cross-sectional view taken along line II—II of FIG. 1, FIG. 3 is a plan view of the styrene foam core used in making the panel of FIG. 1, FIG. 4 is a schematic view of the plumbing connections for an array of a plurality of the panels of FIG. 1, FIG. 5 is a cross-sectional view taken along line V—V of FIG. 4, FIG. 6 is an enlarged view of the circled zone of FIG. 5, FIG. 7 is a cross-sectional view taken along line VII—VII of FIG. 4 and showing a modification of the panel of FIG. 1, and FIG. 8 is a perspective view of a dwelling having a roof mounted array of collector panels in accordance with the present invention.

FIGS. 1 and 2 show a collector panel 10 according to the present invention. The illustrated panel is of a flat surface configuration suitable for use as a roofing panel or for application to an existing roof. The panel is on the order of one or two square meters in area and has a thickness of one or two centimeters. Within the interior of the panel is a pattern of conduits or passages comprising a plurality of parallel ducts 12 which terminate at either end in header or manifold chambers 14, 16. The concrete on the interior is impregnated and coated with a polymer to render the concrete impervious to water, gas, or other fluid heat transfer media.

FIG. 4 shows the interconnection of a plurality of the panels of FIG. 1 to form a collector array for a dwelling roof. The dotted arrow on the right side indicates the down slope direction. A heat transfer medium such as water is circulated through inlet 18 of panel 41 to the lower manifold 16, upwardly through the parallel ducts 12 to the upper manifold 14 and thence through outlet 19. The heat transfer medium then circulates through a "U" pipe 20 to the next panel 42 in similar fashion. The interconnections illustrated in FIG. 4 are a series-parallel arrangement such that pairs of adjacent panels 41, 42 are connected in series. Other pairs of panels 43 and 44, 45 and 46, etc. are connected in series and each such pair of panels is connected in parallel with the other pairs of the array. The overall path of circulation is up slope to take advantage of natural connection.

FIGS. 5-7 show in greater detail the application of the collector panels to a roof. The embodiment illustrated in FIGS. 5-7 is a modification of that of FIG. 1. As can be seen in FIGS. 5 and 6, the panels are adapted to lap one another in shingle or clapboard fashion. As can be seen in FIG. 7, the flat central portion of the panel 10 is bordered by an integral rim 70 which extends below the flat panel 10 to provide an insulating air space below the panel and extends above the panel to provide a rabett 72 to receive a sheet of glass 75 or transparent plastic. Although glass or plastic significantly impedes solar insolation by reflection and by blocking radiation, particularly that outside the visible spectrum, glass reduces conduction and convection losses to the air. Where the ambient air temperature is low or where winds are strong, glass may be desirable to achieve adequate temperatures. FIGS. 6 and 7 also show a lid 76 which covers the piping in the space between panel arrays. A completed installation of collector panels on a roof is shown in FIG. 8.

The following description of the method of making solar collector panels in accordance with the present invention is directed to the flat panel of FIG. 1, although the method is applicable to more complex configurations such as panels simulating roof shingles or terracotta roof tiles. The dimensions and materials are appropriate for a preferred embodiment. Although the method is described in the context of spray application of the concrete, the method can be practiced by hand using hand tools.

The panels are cast in an open mold which imparts the upper face configuration of the panel. The mold can provide a textured surface or can provide a simulation of shingles or tiles. The mold can be of any durable material suitable for concrete casting. Preferably, the mold is made of glass reinforced plastic or glass reinforced concrete (GRC). To aid in release of the cast panel, the mold can be coated with a conventional concrete mold release agent by brush or spray.

When prepared, the mold is laid out on a horizontal surface and a layer of glass reinforced concrete (GRC) 3 or 4 mm. thick is sprayed into the mold. Preferably, the concrete mix is about ¾ cement by weight and ¼ sand by weight before the addition of water. At least 3% and preferably more than 5% by weight of alkali resistant glass fiber, known as AR fiber, is added to the concrete. Such concrete reinforcement fiber is available from Pilkington Bros., Ltd. of England or Owens Corning of the United States. The spray apparatus simultaneously sprays the concrete slurry and projects the glass fibers chopped to the appropriate length of 2 to 10 cm. The first layer of GRC is vibrated or troweled with a float to release air bubbles.

A core to form the passages or waterways is then placed on the first layer of GRC. The core 30 is illustrated in FIG. 3. The core is formed from a sheet of polymer foam such as polystyrene foam. A sheet of polystyrene foam approximately 3 or 4 mm. thick is cut in the pattern illustrated by any appropriate technique such as a steel rule die, a hot wire cutter, or by hand using a template and knife. The pattern comprises bars 13 integral with end pieces 15, 17. The bars 13 correspond to the ducts 12 of the finished panel and the end pieces 15, 17 correspond to the manifold chambers 14, 16 of the panel. The end piece 17 at the bottom of the panel is cut at an angle a to provide the lower manifold chamber with a slope for more complete drainage. The inlet 18 and outlet 19 pipes are affixed to the foam and are thereby properly positioned in the completed panel in communication with the manifold chambers 14, 16.

After the foam core 30 with the inlet and outlet pipes 18, 19 has been positioned in the mold over the first layer of GRC, concrete slurry without glass fiber is sprayed into the mold to fill all the spaces in and around the core 30 with concrete. The mold is again vibrated or troweled with a float to release any air bubbles.

The casting is completed by the spray application of a final layer of GRC 3 or 4 mm. thick and the mold vibrated or troweled to release entrapped air and to provide a smooth surface for the bottom face of the panel.

The cast panel can be released from the mold after the concrete has set, usually the next day. The cast panel is then cured under very high humidity conditions to develop maximum strength. The cure requires about a week of a constant wet environment. The time for cure can be shortened at elevated temperatures. For example, curing at 50° C. requires about two days. When fully cured, the panels are dried to remove all excess water. A week in the sun is sufficient.

When the panels are fully cured and thoroughly dried, the polymer core can be removed. The core is dissolved in an industrial solvent for the polymer. For polystyrene foam suitable solvents include perchloroethylene, trichloroethylene, methyl ethyl ketone, methyl isobutyl ketone, toluene, carbon tetrachloride, benzine, carbon disulphide, ethylene dichloride, methylene chloride, ethyl acetate, and others. Preferably, the solvent is chosen on the basis of availability, cost, toxicity, flamability and low boiling point. Methylene chloride, Methyl ethyl ketone, or trichloroethylene are preferred for polystyrene. Because the density of polymer foams such as polystyrene foam is low, only a relatively small volume of polymer is present in a relatively large volume foam core. Consequently, dissolution of the foam is prompt.

The polymer core is dissolved by circulating the solvent through the panel from a container and back to the container. Preferably a pressure head of a meter or more is employed. The percentage of polymer in the solvent solution increases as cores are dissolved. Preferably, the solution contains a high percentage of dissolved polymer. The polymer-solvent solution wets and penetrates the dry concrete to deposit the polymer solution in the air bubbles and intersticies of the concrete thereby impregnating and sealing the panel passageways against leakage or seepage of water. Further, some of the polymer solution remains as a coating on all of the interior waterway passages of the panel after the solution has been drained from the panel. When so much polymer is dissolved that the viscosity of the solution becomes too great for adequate permeation, more solvent is added. The polymer coating hardens as the solvent evaporates and forms a barrier between the concrete and the water or other heat transfer medium. Thus, the panel is protected against leakage or seepage, and against leaching of the concrete by circulating water. The water, in turn, does not contact the concrete and so does not become alkaline. The completed panel is impervious to water, antifreeze solutions, gases such as propane, butane, flurocarbons, and other fluid heat transfer media.

The solvent from the solution adhering to the passageways can be evaporated into the atmosphere or can be recovered in a closed air circulation system by use of a simple condenser. When solvent is recovered, the solution approaches a steady state ratio of solvent to polymer wherein the volume of polymer left in each panel approximates that brought to the solution by each core.

The completed panel can be painted or stained for appearance and to improve heat absorbtion. Excess polymer solution may be used as a vehicle for the paint, thereby utilizing all byproducts of the process.

I claim:

1. A solar collector panel comprising a one-piece glass fiber reinforced concrete panel having internal passageways in the form of a plurality of parallel ducts which terminate at one end in an inlet manifold chamber and at the other end in an outlet manifold chamber, the internal passageways being sealed with a hardened polymer coating, said solar collector panel including means to assist in drainage of the heat transfer medium, wherein the fiber reinforced concrete is made from a mix comprising cement and sand, and in addition, includes at least 3% by weight alkalai resistant glass fiber.

2. The solar collector panel of claim 1 wherein the polymer is polystyrene.

* * * * *